United States Patent
Roh et al.

(10) Patent No.: US 7,643,574 B2
(45) Date of Patent: Jan. 5, 2010

(54) TRANSMITTING APPARATUS AND METHOD IN TRANSMIT DIVERSITY SYSTEM

(75) Inventors: Jae-ho Roh, Seoul (KR); Young-chai Ko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 568 days.

(21) Appl. No.: 11/449,759

(22) Filed: Jun. 9, 2006

(65) Prior Publication Data

US 2007/0041471 A1 Feb. 22, 2007

(30) Foreign Application Priority Data

Aug. 18, 2005 (KR) ............ 10-2005-0075885

(51) Int. Cl.
*H04L 27/04* (2006.01)
*H04L 27/12* (2006.01)
*H04L 27/20* (2006.01)

(52) U.S. Cl. ............ 375/299; 375/267; 375/346; 375/285

(58) Field of Classification Search ............ 375/299, 375/267, 346, 285; 455/101, 114.2
See application file for complete search history.

(56) References Cited

U.S. PATENT DOCUMENTS

| 6,317,411 | B1* | 11/2001 | Whinnett et al. | 370/204 |
| 7,006,579 | B2* | 2/2006 | Kuchi et al. | 375/295 |
| 7,123,887 | B2* | 10/2006 | Kim et al. | 455/103 |
| 7,403,748 | B1* | 7/2008 | Keskitalo et al. | 455/101 |
| 2003/0228850 | A1* | 12/2003 | Hwang | 455/101 |

* cited by examiner

*Primary Examiner*—Phuong Phu
(74) *Attorney, Agent, or Firm*—Sughrue Mion, PLLC

(57) ABSTRACT

A transmitting apparatus and method in a transmit diversity system, which transmits a plurality of block-coded symbols over a plurality of antennas are provided. The transmitting apparatus includes N+M antennas where N is an integer equal to or greater than two and M is an integer equal to or greater than one; a switch which forwards N-ary block-coded symbols to N-ary antennas of the N+M antennas; and a switch controller which controls switching of the switch, and when a receiving end which receives the N-ary block-coded symbols informs the switch controller of a poor reception state, the switch controller forwards the N-ary block-coded symbols to other N-ary antennas which include at least one antenna different from the N-ary antennas. The block-coded symbols can be transmitted by selectively using more antennas than block-coded symbols.

8 Claims, 5 Drawing Sheets

TRANSMITTING APPARATUS AND METHOD IN TRANSMIT DIVERSITY SYSTEM

CROSS-REFERENCE TO RELATED APPLICATIONS

This application claims priority under 35 U.S.C. § 119 (a) from Korean Patent Application No. 10-2005-0075885 filed on Aug. 18, 2005 in the Korean Intellectual Property Office, the entire disclosure of which is incorporated herein by reference.

BACKGROUND OF THE INVENTION

1. Field of the Invention

Methods and apparatuses consistent with the present invention relate to a transmit diversity system, and more particularly, a transmit diversity system which transmits a plurality of block-coded symbols over a plurality of antennas.

2. Description of the Related Art

A transmit diversity system transmits block-coded symbols to a receiver over a plurality of antennas. The transmit diversity system is prevalently used due to its excellent transmission performance over wireless channels.

Figure 1:
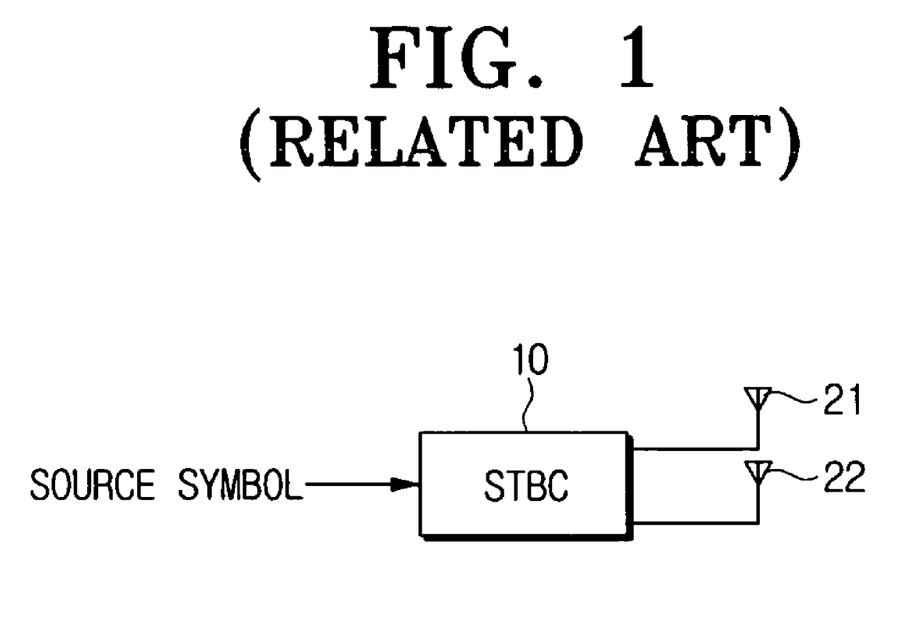
FIG. 1 is a block diagram of a related art transmitting apparatus adopted in a transmit diversity system.

FIG. 1 is a block diagram of a related art transmitting apparatus adopted in the transmit diversity system. In FIG. 1, the transmitting apparatus includes a space-time block coder (STBC) 10, a first antenna 21 and a second antenna 22.

The STBC 10 generates two STBC symbols by space-time block coding a source symbol. The two STBC symbols generated by the STBC 10 are transmitted to a receiver over the first antenna 21 and the second antenna 22, respectively.

In FIG. 1, it is explained that the transmit diversity system transmits the two STBC symbols generated by the STBC 10 over the two antennas, by way of example. As shown in FIG. 1, the number of the STBC symbols to be transmitted equals to the number of the antennas transmitting the symbols in the transmit diversity system according to the related art.

Accordingly, if four STBC symbols are to be transmitted, four antennas are required, and if eight STBC symbols are to be transmitted, eight antennas are required.

SUMMARY OF THE INVENTION

The present invention has been provided to address the above-mentioned and other problems and disadvantages occurring in the conventional arrangement, and an aspect of the present invention provides a transmit diversity system which transmits block-coded symbols by selectively using antennas which are more than the block-coded symbols in number so as to improve a transmission performance.

A transmitting apparatus in a transmit diversity system, includes antennas which are N+M in number where N is an integer equal to or greater than two and M is an integer equal to or greater than one; a switch which forwards N-ary block-coded symbols to N-ary antennas of the N+M antennas; and a switch controller which controls a switching operation of the switch to forward the N-ary block-coded symbols to the N-ary antennas, respectively, among the N+M antennas, and when a poor reception state is determined, the switch controller controls the switching operation of the switch to forward the N-ary block-coded symbols to other N-ary antennas which include at least one antenna different from the N-ary antennas.

The switch controller may control a switch operation of the switch to forward the N-ary block-coded symbols to arbitrary N-ary antennas, respectively, among the N+M antennas.

The switch controller, when a receiving end which receives the N-ary block-coded symbols informs the switch controller that the reception state is poor, may control a switching operation of the switch to forward the N-ary block-coded symbols, respectively, to other N-ary antennas which include at least one antenna different from the N-ary antennas.

The reception state may be poor when a total signal-to-noise ratio (SNR) which is a summation of SNRs in relation with the N-ary block-coded symbols received by the receiving end, is smaller than a threshold SNR, and the reception state may be good when the total SNR is equal to or greater than the threshold SNR.

The reception state may be one bit which represents a good reception state or a poor reception state.

The switch controller, when the reception state is poor with respect to a particular block-coded symbol, may control a switching operation of the switch to forward the block-coded symbol having the poor reception state to one of the N+M antennas excluding the N-ary antennas.

A transmitting method of a transmit diversity system, includes receiving N-ary block-coded symbols over N-ary antennas among N+M antennas where N is an integer equal to or greater than two and M is an integer equal to or greater than one; and transmitting, when a poor reception state is determined, transmitting the N-ary block-coded symbols over other N-ary antennas which include at least one antenna different from the N-ary antennas.

The N-ary block-coded symbols may be transmitted over arbitrary N-ary antennas among the N+M antennas.

When a receiving end which receives the N-ary block-coded symbols informs the switch controller that the reception state is poor, the N-ary block-coded symbols may be transmitted over the other N-ary antennas which include at least one antenna different from the N-ary antennas.

The reception state may be poor when a total signal-to-noise ratio (SNR) which is a summation of SNRs in relation with the N-ary block-coded symbols received by the receiving end, is smaller than a threshold SNR, and the reception state may be good when the total SNR is equal to or greater than the threshold SNR.

The reception state may be one bit which represents either a good reception or a poor reception.

The transmitting method may further include transmitting, when the reception state is poor with respect to a particular block-coded symbol, the particular block-coded symbol having the poor reception over one of the N+M antennas excluding the N-ary antennas.

BRIEF DESCRIPTION OF THE DRAWING FIGURES

These and/or other aspects and advantages of the invention will become apparent and more readily appreciated from the following description of exemplary embodiments, taken in conjunction with the accompanying drawing figures of which.

DETAILED DESCRIPTION OF THE EXEMPLARY EMBODIMENTS

Certain exemplary embodiments of the present invention will now be described in greater detail with reference to the accompanying drawings.

In the following description, the same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 2:
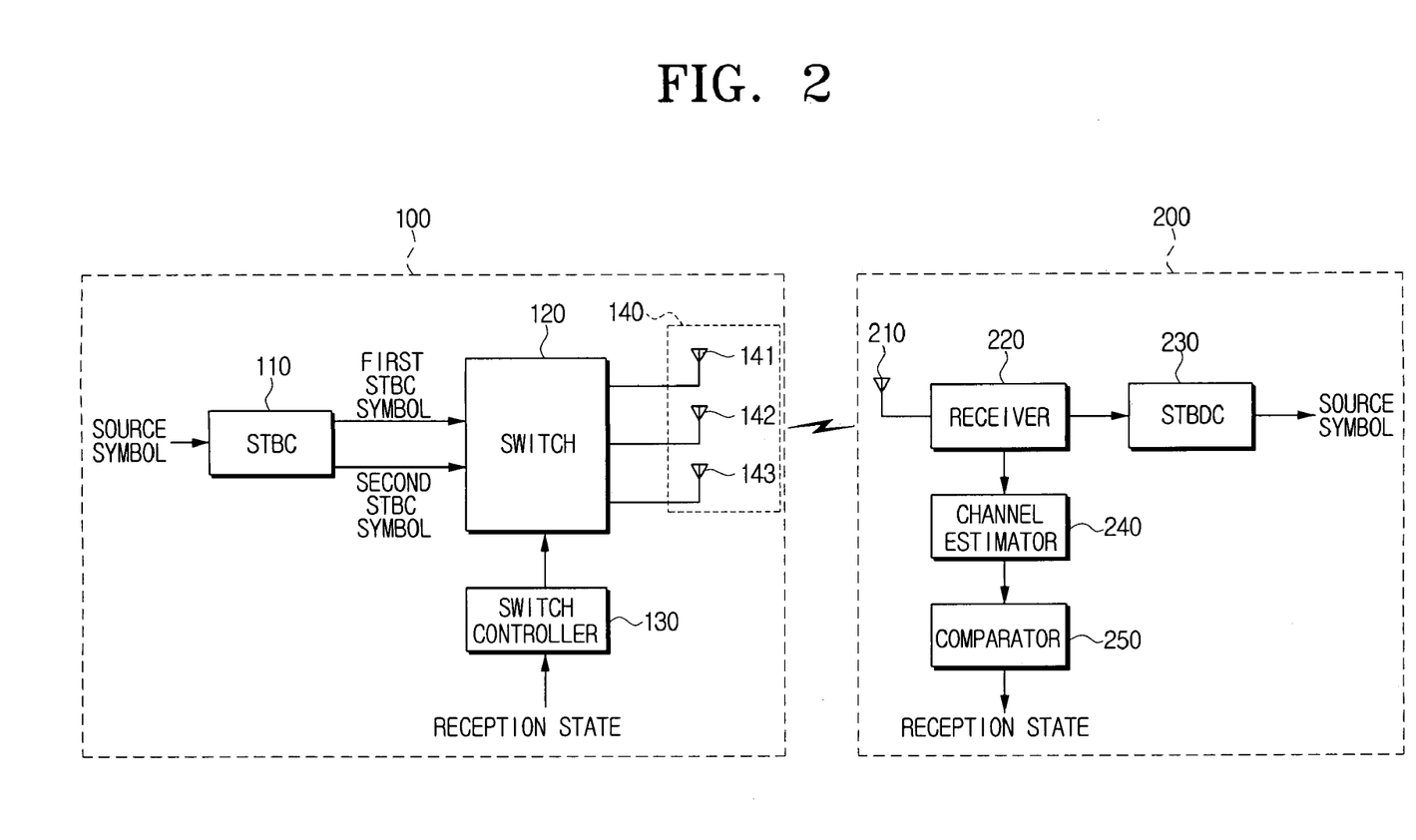
FIG. 2 is a block diagram of a transmit diversity system to which the present invention is applicable.

FIG. 2 is a block diagram of a transmit diversity system to which the present invention is applicable. In FIG. 2, the transmit diversity system is implemented by interconnecting a transmitting apparatus 100 and a receiving apparatus 200 over wireless channels. Put simply, the transmitting apparatus 100 may be a base station, and the receiving apparatus 200 may be a portable terminal device. It should be appreciated however, that the present invention is not limited to those examples.

The transmitting apparatus 100 transmits a source symbol as two STBC symbols, that is, as first and second STBC symbols. At this time, the transmitting apparatus 100 selectively uses two of three antennas. As shown in FIG. 2, the transmitting apparatus 100 includes a space-time block coder (STBC) 110, a switch 120, a switch controller 130 and an antenna portion 140.

The STBC 110 generates two STBC symbols, that is, the first and second STBC symbols by space-time block coding the source symbol.

The antenna portion 140 includes three antennas 141, 142 and 143. The number of antennas (3) in the antenna 140 is greater than the number of STBC symbols (2) generated by the STBC 110 by one.

The switch 120 switches such that the first and second STBC symbols generated by the STBC 110 are forwarded to two of the first, second, and third antennas 141, 142 and 143, respectively. As a result, the first and second STBC symbols can be transmitted to the receiving apparatus 200. The switching operation of the switch 120 is controlled by the controller 130, to be explained.

Since the STBC symbols are transferred to two of the first, second and third antennas 141, 142 and 143 and then transmitted to the receiving apparatus 200, only the two antennas are used for the symbol transmission and the remaining antenna is unused.

The switch controller 130 controls the switching operation of the switch 120. In detail, the switch controller 130 controls the switching operation of the switch 120 so that the first and second STBC symbols can be transferred to i) the first and second antennas 141 and 142, ii) the first and third antennas 141 and 143, or iii) the second and third antennas 142 and 143.

The switch controller 130 can determine two antennas to transmit the first and second STBC symbols not only arbitrarily but also in reference to a "reception state," communicated from the receiving apparatus 200, which will be described in detail.

The receiving apparatus 200 restores the source symbols using the first and second STBC symbols received from the transmitting apparatus 100. As shown in FIG. 2, the receiving apparatus includes an antenna 210, a receiver 220, a space-time block decoder (STBDC) 230, a channel estimator 240 and a comparator 250.

The receiver 220 receives the STBC symbols from the transmitting apparatus 100 over the antennal 210. The STBDC 230 restores the source symbol by space-time block decoding the received first and second STBC symbols.

The channel estimator 240 detects a signal-to-noise ratio (SNR) with respect to the STBC symbols received by the receiver 220 for the sake of a channel state estimation. The channel estimator 240 detects a first SNR $\gamma_1$ with respect to the first STBC symbol and a second SNR $\gamma_2$ with respect to the second STBC symbol, respectively, and then provides the detected first and second SNRs $\gamma_1$ and $\gamma_2$ to the comparator 250.

The comparator 250 compares the summation of the first and second SNRs $\gamma_1$ and $\gamma_2$ (hereafter, referred to as a total SNR $\gamma_t$), with a threshold SNR $\gamma_T$, and thus determines the reception state of the STBC symbols. Herein, the threshold SNR $\gamma_T$ is an index which is a criterion to determine whether the reception state of the first and second STBC symbols is good or poor.

Magnitude of the threshold SNR $\gamma_T$ can be set as necessary. For example, provided that a bit error rate (BER) of 1% is required to acquire satisfactory quality of service (QoS) and a corresponding SNR is 4.32 dB, the threshold SNR $\gamma_T$ is set to 4.32 dB. It is possible to change the set threshold SNR $\gamma_T$ if necessary.

In the determination of the reception state, i) when the total SNR $\gamma_t$ is smaller than the threshold SNR $\gamma_T$, the comparator 250 determines that the reception state of the first and second STBC symbols is poor and ii) when the total SNR $\gamma_t$ is equal to or greater than the threshold SNR $\gamma_T$, the comparator 250 determines that the reception state of the first and second STBC symbols is good.

Accordingly, the reception state determined by the comparator 250 is classified into "good" or "poor". The determined reception state is communicated to the switch controller 130 of the transmitting apparatus 100. Specifically, when a transmitter (not shown) of the receiving apparatus 200 transmits the reception state over the antenna 210, a receiver (not shown) of the transmitting apparatus 100 receives the reception state over the antenna portion 140 and forwards it to the switch controller 130 so that the switch controller 130 can be informed of the reception state determined by the comparator 250.

Next, the switch controller 130 selects two antennas to transmit the first and second STBC symbols based on the informed reception state, which will be described in further detail.

Figure 3:
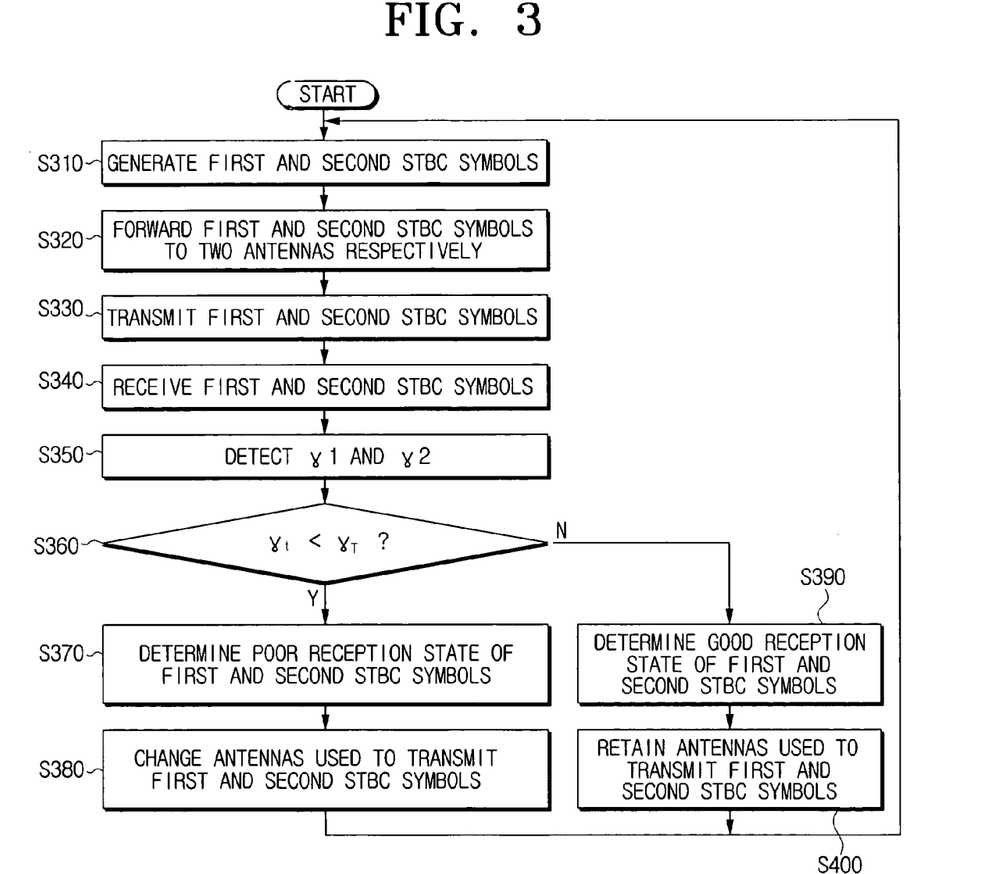
FIG. 3 is a flowchart outlining a transmitting method in the transmit diversity system according to one exemplary embodiment of the present invention.

FIG. 3 is a flowchart outlining a transmitting method in the transmit diversity system according to one exemplary embodiment of the present invention;

Referring now to FIG. 3, the STBC 100 generates the first and second STBC symbols by space-time block encoding the source symbol (S310).

The switch controller 130 controls the switching operation of the switch 120 to transfer the first and second STBC symbols generated by the STBC 110 to two of the first, second and third antennas 141, 142 and 143, respectively (S320). At this time, the switch controller 130 can arbitrarily select two antennas to transmit the first and second STBC symbols.

Specifically, the switch controller 130 controls the switching operation of the switch 120 so that the first and second STBC symbols can be transferred to i) the first and second antennas 141 and 142, ii) the first and third antennas 141 and 143, or iii) the second and third antennas 142 and 143, respectively.

Hence, the first and second STBC symbols are transmitted to the receiving apparatus 200 over the two antennas selected by the switch controller 130 (S330). Because the STBC symbols are transferred to two of the first, second and third antennas 141, 142 and 143 and then transmitted to the receiving apparatus 200, only the two antennas are used for the symbol transmission and the remaining antenna is unused.

Next, the receiver 220 receives the first and second STBC symbols from the transmitting apparatus 100 over the antenna 210 (S340).

The channel estimator 240 detects the first SNR $\gamma_t$ and the second SNR $\gamma_2$, respectively (S350). As mentioned above, the first SNR $\gamma_T$ is a SNR with respect to the first STBC symbol, and the second SNR $\gamma_2$ is a SNR with respect to the second STBC symbol.

The comparator 250 compares the total SNR $\gamma_t$ (=$\gamma_1$+$\gamma_2$) with the threshold SNR $\gamma_T$ (S360). As mentioned above, the total SNR $\gamma_t$ is the summation of the first and second SNRs $\gamma_1$ and $\gamma_2$, and the threshold SNR $\gamma_T$ is an index which is the criterion to determine whether the reception state of the first and second STBC symbols is good or poor.

When a determination is made that the total SNR $\gamma_t$ is smaller than the threshold $\gamma_T$ (S360-Y), the comparator 250 determines that the reception state of the first and second STBC symbols is poor (S370). The determination result is communicated to the switch controller 130 of the transmitting apparatus 100.

The switch controller 130 changes the antennas which were used to transmit the first and second STBC symbols (S380). Specifically, the switch controller 130 controls the switching operation of the switch 120 to transfer the first and second STBC symbols to other two antennas than the two antennas to which the first and second STBC symbols are transferred at operation S320.

For example, in case that the first and second STBC symbols are transferred to the first and second antennas 141 and 142 at operation S320, the switch controller 130 controls the switching operation of the switch 120 to forward the first and second STBC symbols to the first and third antennas 141 and 143, or the second and third antennas 142 and 143, respectively.

In contrast, when a determination is made that the total SNR $\gamma_t$ is equal to or greater than the threshold $\gamma_T$ (S360-N), the comparator 250 determines that the reception state of the first and second STBC symbol is good (S390). The determination result is communicated to the switch controller 130 of the transmitting apparatus 100.

The switch controller 400 retains the antennas which were used to transmit the first and second STBC symbols without change (S400). Specifically, the switch controller 130 controls the switching operation of the switch 120 to continuously forward the first and second STBC symbols to the two antennas which transferred the first and second STBC symbols at operation S320.

For example, in case that the first and second STBC symbols are forwarded to the first and second antennas 141 and 142 at operation S320, the switch controller 130 controls the switching operation of the switch 120 so that the first and second STBC symbols can be continuously forwarded to the first and second antennas 141 and 142.

It has been explained on how to enhance the transmission performance by classifying the reception state of the first and second STBC symbols into "good" and "poor" and changing the antennas used to transmit the first and second STBC symbols according to the result of the classification. In this scheme, it is possible to express the reception state as one bit. For example, the good reception state can be expressed as "0" and the poor reception state can be expressed as "1".

Meanwhile, when the total SNR $\gamma_t$ is smaller than the threshold SNR $\gamma_T$, that is, when the reception state of the first and second STBC symbols is poor according to the determination, the comparator 250 may determine which STBC symbol has poor reception state by comparing the first SNR $\gamma_1$ and the second SNR $\gamma_2$.

Specifically, i) when the first SNR $\gamma_1$ is smaller than the second SNR $\gamma_2$, the comparator 250 determines the poor reception state of the first STBC symbol, and ii) when the second SNR $\gamma_2$ is smaller than the first SNR $\gamma_1$, the comparator 250 determines the poor reception state of the second STBC symbol.

Accordingly, the reception state determined by the comparator 250 can be classified into "the poor reception state of the first STBC symbol" and "the poor reception state of the second STBC symbol". In this case, the determined reception state is communicated to the switch controller 130 of the transmitting apparatus 100.

The switch controller 130 selects two antennas to transmit the first and second STBC symbols in reference to the communicated reception state, which is now described in detail.

Figure 4:
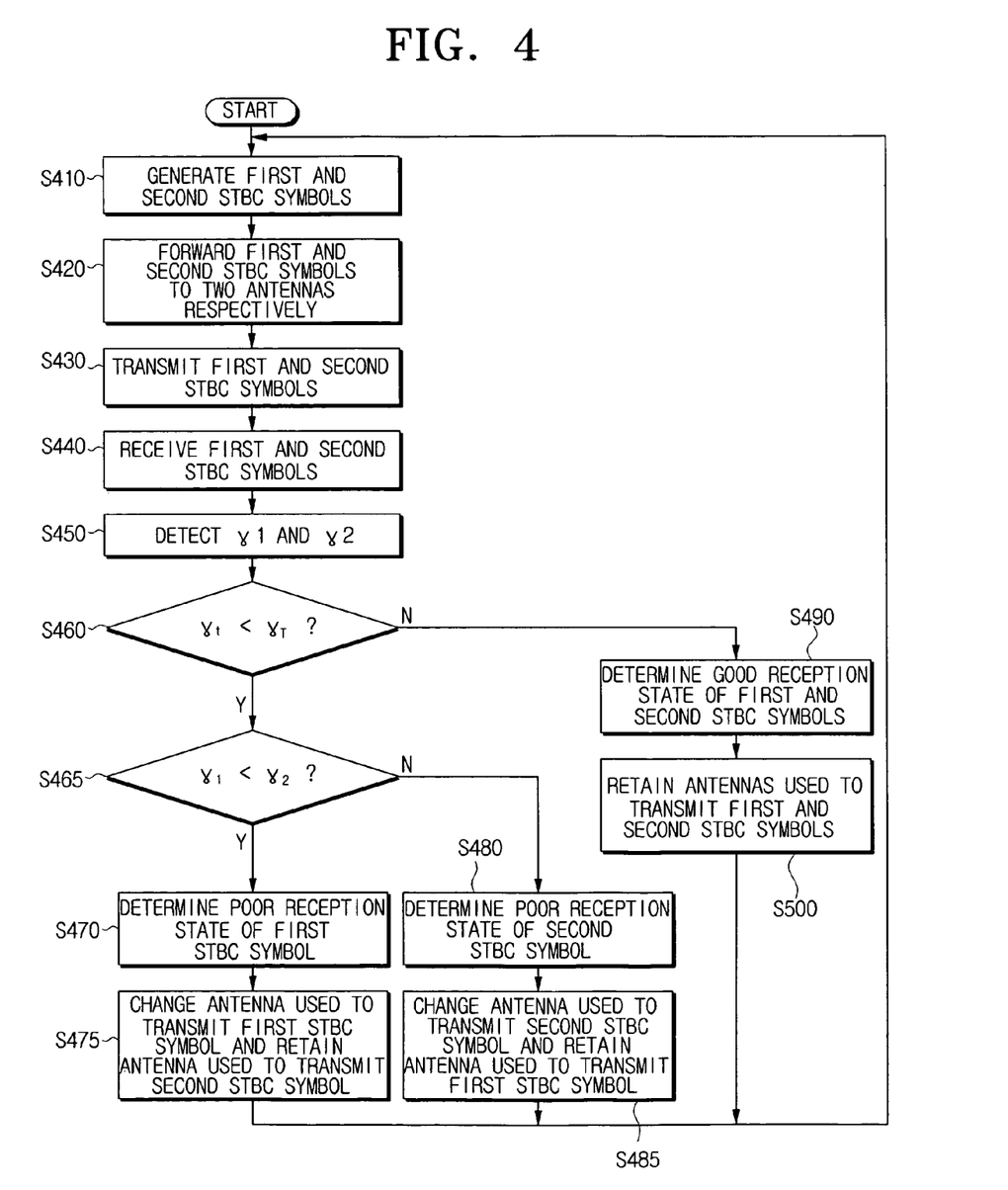
FIG. 4 is a flowchart outlining a transmitting method in the transmit diversity system according to another exemplary embodiment of the present invention.

FIG. 4 is a flowchart outlining a transmitting method in the transmit diversity system according to another exemplary embodiment of the present invention. Operations S410 through S460 in FIG. 4 correspond to operation S310 through S360 in FIG. 3, and operation S490 and S500 correspond to operations S390 and S400 in FIG. 3. Thus, detailed descriptions thereof will be omitted for concise, and only operations S465 through S485, which are not illustrated in FIG. 3, are set forth below.

When a determination is made that the total SNR $\gamma_t$ is smaller than the threshold SNR $\gamma_T$ (S460-Y), the comparator 250 compares the first SNR $\gamma_1$ and the second SNR $\gamma_2$ (S465).

When the first SNR $\gamma_1$ is smaller than the second SNR $\gamma_2$ (S465-Y), the comparator 250 determines that the reception state of the first STBC symbol is poor (S470). This determination result is communicated to the switch controller 130 of the transmitting apparatus 100.

In this case, the switch controller 130 changes the antenna which transmitted the first STBC symbol, and retains the antenna which transmitted the second STBC symbol (S475). Specifically, the switch controller 130 controls the switching operation of the switch 120 to forward the first STBC symbol to the other antenna instead of the antenna to which the first STBC symbol was forwarded at operation S420, and to continuously forward the second STBC symbol to the antenna which the second STBC symbol was forwarded at operation S420.

For example, in case that the first and second STBC symbols was forwarded to the first and second antennas 141 and 142 at operation S420, the switch controller 130 controls the switching operation of the switch 120 to forward the first STBC symbol to the third antenna 143 and to continuously forward the second STBC symbol to the second antenna 142.

In contrast, when the second SNR $\gamma_2$ is smaller than the first SNR $\gamma_1$ (S465-N), the comparator 250 determines that the reception state of the second STBC symbol is poor (S480). This determination result is communicated to the switch controller 130 of the transmitting apparatus 100.

In this case, the switch controller 130 changes the antenna which transmitted the second STBC symbol, and retains the antenna which transmitted the first STBC symbol (S485). Specifically, the switch controller 130 controls the switching operation of the switch 120 to forward the second STBC symbol to the other antenna instead of the antenna to which the second STBC symbol was forwarded at operation S420, and to continuously forward the first STBC symbol to the antenna which the first STBC symbol was forwarded at operation S420.

For example, in case that the first and second STBC symbols was forwarded to the first and second antennas 141 and 142 at operation S420, the switch controller 130 controls the switching operation of the switch 120 to continuously forward the first STBC symbol to the first antenna 141 and to forward the second STBC symbol to the third antenna 143.

It has been explained that the transmission performance is enhanced by changing the antenna used to transmit the STBC symbol having the poor reception state to another antenna. In this scheme, it is possible to communicate express data regarding the reception state using two bits. For example, the good reception state can be expressed as "00", the poor reception state of the first STBC symbol can be expressed as "01", and the poor reception state of the second STBC symbol can be expressed as "10".

The descriptions so far have been made on the transmit diversity system which transmits the block-coded symbols by selectively using antennas which are more than the block-coded symbols in number according to exemplary embodiments of the present invention.

In the exemplary embodiments of the present invention, it has been exemplified that the source symbol is delivered as two STBC symbols, for the understanding not for the limitation. Note that the present invention is applicable in case that the source symbol is delivered as N (N≧2) STBC symbols.

It has been exemplified that the number of antennas in the transmitting apparatus 100 is greater than the number of transmitted STBC symbols by one, for the understanding not for the limitation. Note that the present invention is applicable in case that the number of antennas is greater than the number of STBC symbols (N) by M (M≧1), that is, in case that the number of antennas is N+M.

It has been exemplified that only one antenna is equipped to the receiving apparatus 200, for the understanding not for the limitation. Note that the present invention is applicable in case that the number of antennas in the receiving apparatus 200 is more than 1.

Figure 5:
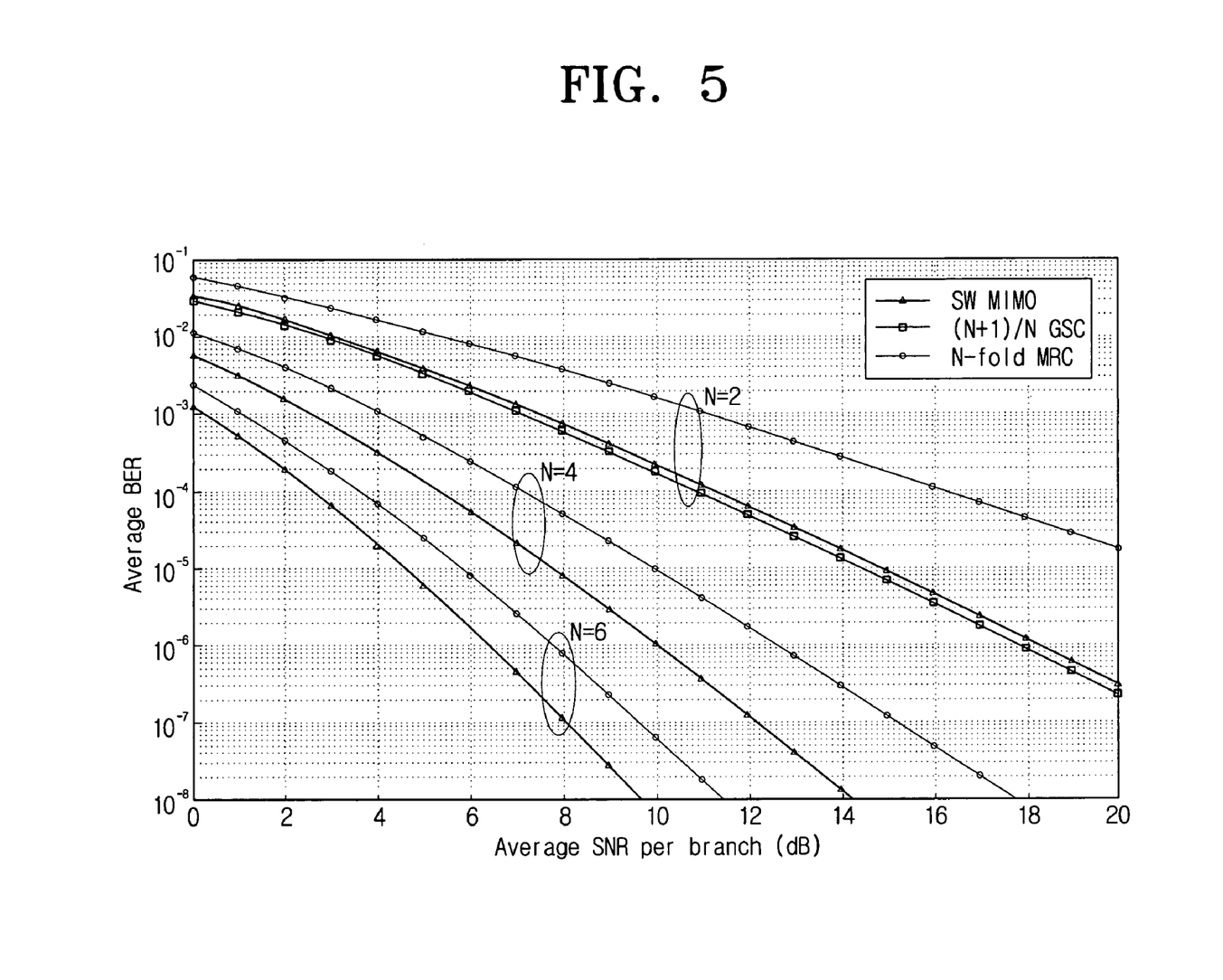
FIG. 5 is a graph showing simulation results of the transmit diversity system according to an exemplary embodiment of the present invention.

FIG. 5 shows simulation results of the transmit diversity system according to an exemplary embodiment of the present invention. FIG. 5 shows a transmission performance of a switched multiple-input multiple-output (SW MIMO), a (N+1)/N generalized selection combination (GSC), and an N-fold maximal ratio combining (MRC), respectively, when the number of STBC symbols (N) transmitted from the transmitting apparatus is 2, 4 and 6.

In FIG. 5, the SW MIMO according an exemplary embodiment of the present invention shows the transmission performance when N-ary STBC symbols are transmitted over N-ary antennas among N+1 antennas. The (N+1)/N GSC shows the transmission performance when the N-ary STBC symbols are transmitted over N-ary antennas which have the best channel state among the N+1 antennas, and the N-folded MRC shows the transmission performance when the N-STBC symbols are transmitted over N-ary antennas.

As shown in FIG. 5, the transmission performance of SW MIMO excels the N-fold MRC and approximates to the (N+1)/N GSC.

As set forth above, the block-coded symbols can be transmitted by selectively using antennas which are more than the block-coded symbols in number. Since the antenna which has been used to transmit the block-coded symbol which suffers poor reception state at the receiving apparatus is changed to another antenna, the transmission performance can be enhanced.

The transmit diversity system according to an exemplary embodiment of the present invention can be simply implemented because it is required merely to add antennas and switches and the implementation of its algorithm is very simple.

Furthermore, it is possible to represent the reception state fed back to the transmitting end from the receiving end as a relatively small amount of data.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A transmitting apparatus in a transmit diversity system, comprising:
   antennas which are N+M in number where N is an integer equal to or greater than two and M is an integer equal to or greater than one;
   a switch which forwards N-ary block-coded symbols to N-ary first antennas of the N+M antennas; and
   a switch controller which controls a switching operation of the switch to forward the N-ary block-coded symbols to the N-ary first antennas, respectively, among the N+M antennas, and when a reception state is determined to be poor, the switch controller controls the switching operation of the switch to forward the N-ary block-coded symbols to N-ary second antennas which include at least one antenna different from the N-ary first antennas,
   wherein the switch controller controls the switching operation of the switch to forward the N-ary block-coded symbols to arbitrary N-ary first antennas respectively among the N+M antennas, and
   wherein the switch controller, when a receiving end which receives the N-ary block-coded symbols informs the switch controller that the reception state is poor, controls the switching operation of the switch to forward the N-ary block-coded symbols, respectively to arbitrary N-ary second antennas which include at least one antenna different from the arbitrary N-ary first antennas.

2. The transmitting apparatus of claim 1, wherein the reception state is poor when a total signal-to-noise ratio (SNR) which is a summation of SNRs in relation with the N-ary block-coded symbols received by the receiving end, is smaller than a threshold SNR, and wherein the reception state is good when the total SNR is equal to or greater than the threshold SNR.

3. The transmitting apparatus of claim 1, wherein the reception state is one bit which represents either a good reception state or a poor reception state.

4. The transmitting apparatus of claim 1, wherein the switch controller, when the reception state is poor with respect to a particular block-coded symbol, controls the switching operation of the switch to forward the particular block-coded symbol having the poor reception state to one of the N+M antennas excluding the N-ary first antennas.

5. A transmitting method of a transmit diversity system, comprising:
   transmitting N-ary block-coded symbols over N-ary first antennas among N+M antennas where N is an integer equal to or greater than two and M is an integer equal to or greater than one; and transmitting the N-ary block-coded symbols over N-ary second antennas which include at least one antenna different from the N-ary first antennas when a reception state is determined to be poor, wherein the N-ary block-coded symbols are transmitted over arbitrary N-ary first antennas among the N+M antennas, and wherein, when a receiving end which receives the N-ary block-coded symbols informs the switch controller that the reception state is poor, the N-ary block-coded symbols are transmitted over the arbitrary N-ary second antennas which include at least one antenna different from the arbitrary N-ary first antennas.

6. The transmitting method of claim 5, wherein the reception state is poor when a total signal-to-noise ratio (SNR) which is a summation of SNRs in relation with the N-ary block-coded symbols received by the receiving end, is smaller than a threshold SNR, and wherein the reception state is good when the total SNR is equal to or greater than the threshold SNR.

7. The transmitting method of claim 5, wherein the reception state is one bit which represents either a good reception state or a poor reception state.

8. The transmitting method of claim 5, further comprising:
transmitting a particular block-coded symbol having the poor reception over one of the N+M antennas excluding the N-ary first antennas when the reception state is poor with respect to the particular block-coded symbol.

* * * * *